Figure 1:
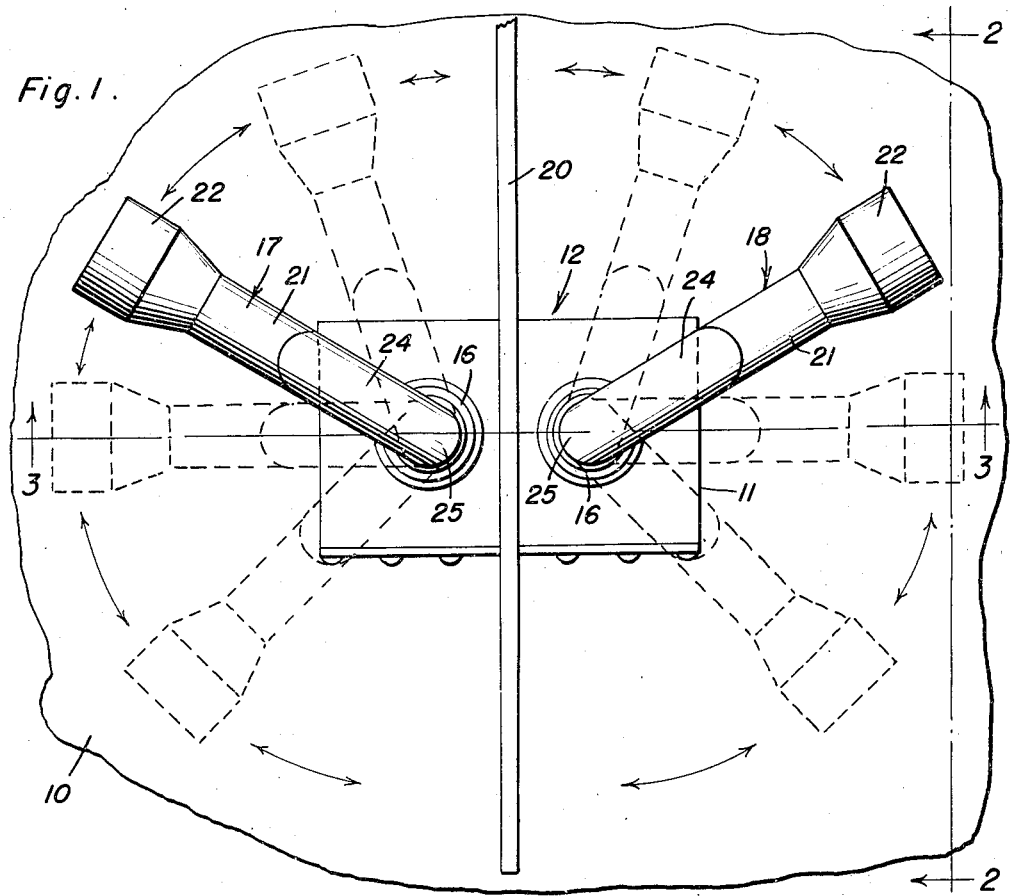

Nov. 8, 1949  A. A. BAXTER  2,487,414
WIND GAUGE
Filed Dec. 15, 1947  4 Sheets-Sheet 1

Adrian A. Baxter
INVENTOR.

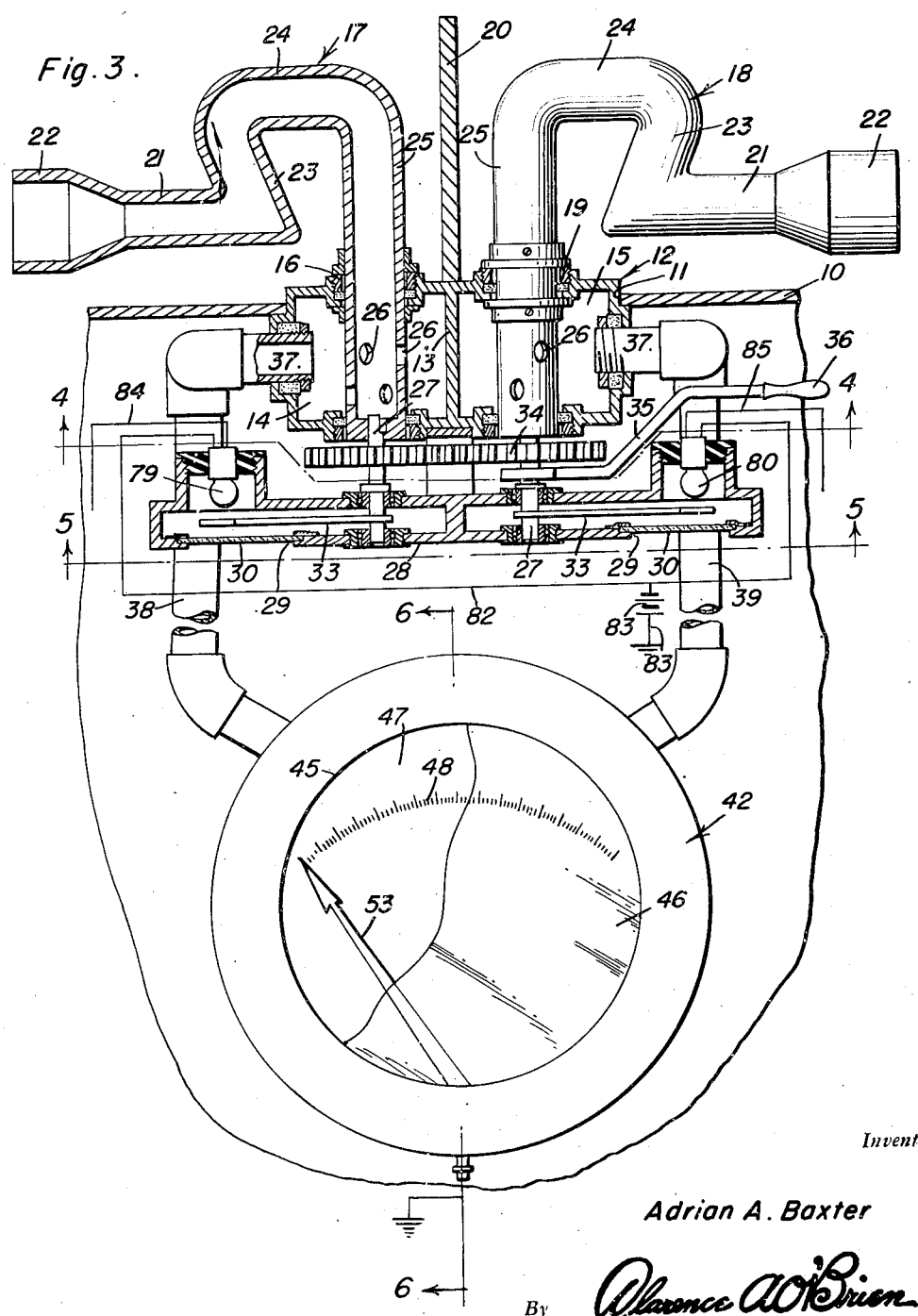

Nov. 8, 1949  A. A. BAXTER  2,487,414
WIND GAUGE
Filed Dec. 15, 1947  4 Sheets-Sheet 3

Inventor
Adrian A. Baxter
By *Clarence A. O'Brien and Harvey B. Jacobson*
Attorneys Nov. 8, 1949     A. A. BAXTER     2,487,414
WIND GAUGE Filed Dec. 15, 1947     4 Sheets-Sheet 4

Inventor
Adrian A. Baxter

Patented Nov. 8, 1949

2,487,414

UNITED STATES PATENT OFFICE 2,487,414

WIND GAUGE

Adrian A. Baxter, Brownville, N. Y.

Application December 15, 1947, Serial No. 791,806

10 Claims. (Cl. 73—189)

This invention relates to a wind gauge and has for its primary object to determine the direction and velocity of the wind blowing across the direction of travel of a moving carrier such as a ship or aircraft.

Another object is to avoid the effects of the wind pressure created by the motion of the vehicle through the air.

The above and other objects may be attained by employing this invention which embodies among its features a pair of funnels mounted to oscillate about spaced parallel axes, means to move said funnels in unison in opposite directions through substantially 180 degree arcs, a fluid pressure responsive diaphragm against opposite sides of which air entering the funnels is directed and means actuated by the flexing of the diaphragm to register the pressure exerted thereon.

Other features include means movable with the funnels to indicate in degrees the angular positions of the funnels with relation to the direction in which the vehicle is moving, and a baffle between the funnels for preventing an air current directed toward one side of the gauge from entering the funnel on the opposite side thereof.

Still other features include an air chest having two separate chambers, a wind collecting funnel opening into each chamber of the air chest, each funnel being mounted in its respective chamber to rotate in a horizontal arc, means to rotate said funnels in unison in opposite directions, a fluid pressure responsive diaphragm, means leading from one chamber to direct air entering said chamber against one side of the diaphragm, means leading from the opposite chamber to direct air entering said chamber against the opposite side of the diaphragm, and means actuated by the flexing of the diaphragm to register the pressure exerted thereon.

Figure 2:
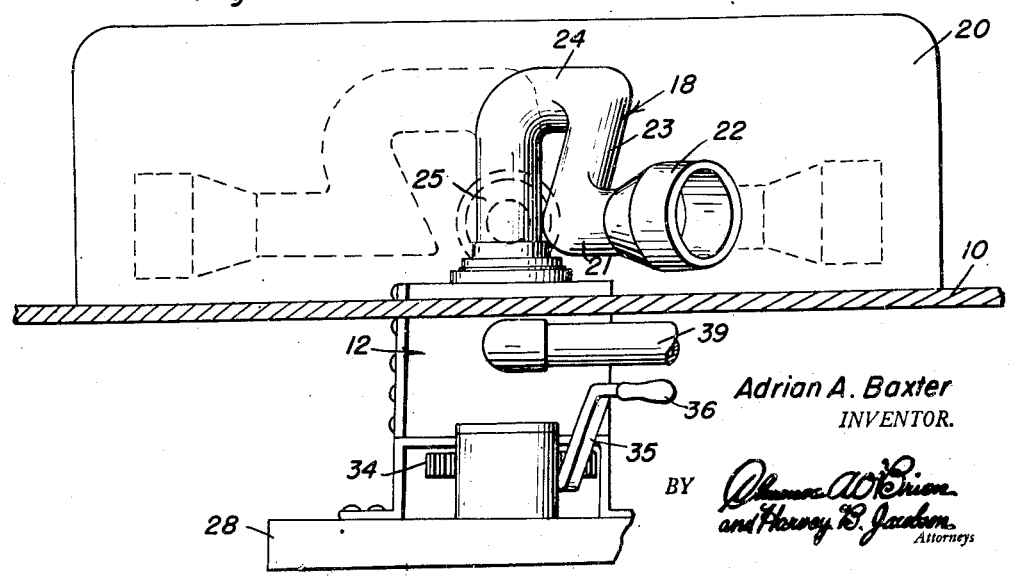
Figure 6:
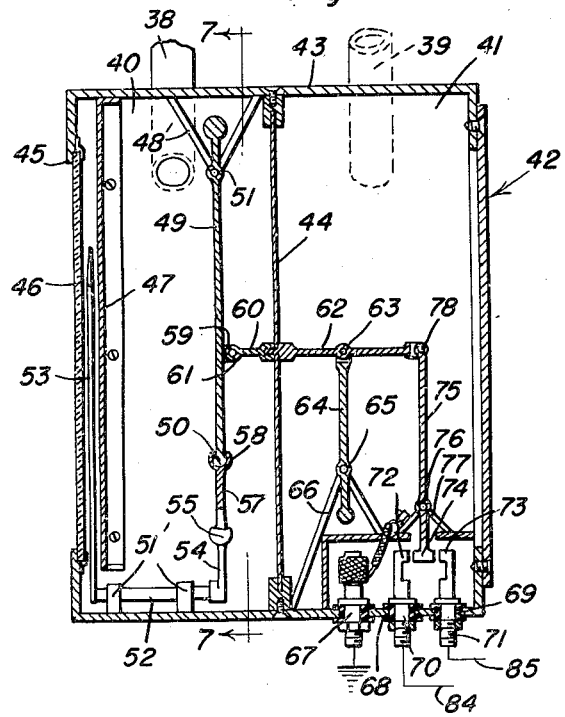
Figure 7:
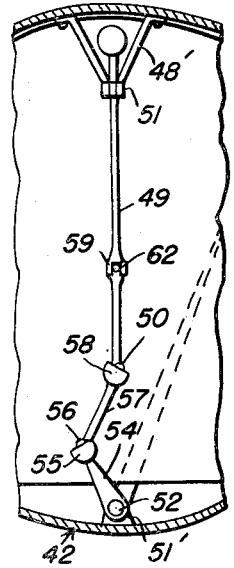
Figure 4:
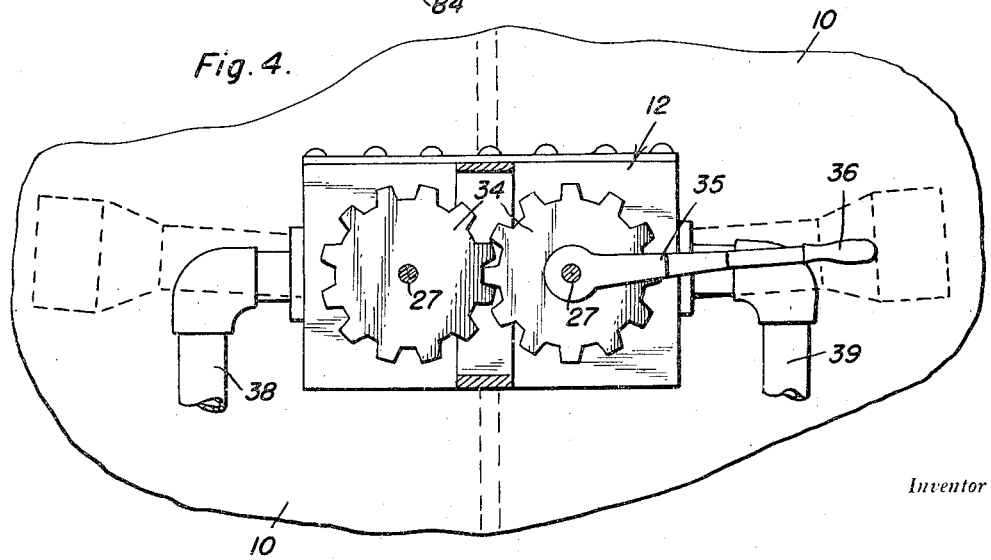
Figure 5:
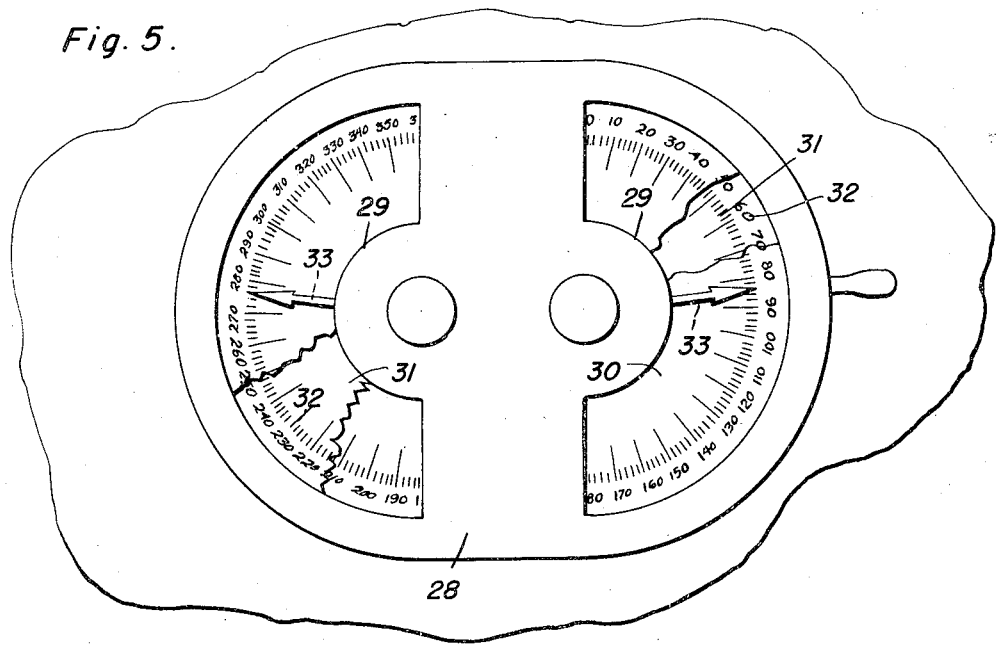

In the drawings:

Figure 1 is a top plan view of a fragment of a vehicle, such as the deck of a vessel, illustrating this improved wind gauge mounted thereon, Figure 2 is a sectional view taken substantially along the line 2—2 of Figure 1, Figure 3 is a sectional view taken substantially along the line 3—3 of Figure 1, Figure 4 is a horizontal sectional view taken substantially along the line 4—4 of Figure 3, Figure 5 is a horizontal sectional view taken substantially along the line 5—5 of Figure 3, Figure 6 is a vertical sectional view taken substantially along the line 6—6 of Figure 3, Figure 7 is a vertical sectional view taken substantially along the line 7—7 of Figure 6.

Referring to the drawings in detail, a deck 10 is equipped with a rectangular opening 11 in which the wind chest designated generally 12 of this improved wind gauge is mounted. This wind chest 12 comprises a substantially rectangular hollow body provided intermediate opposite ends with a partition 13 which separates the wind chest into two separate chambers 14, and 15 respectively. Mounted for rotation through a suitable packing gland 16 in the top wall of the chamber 14 is a funnel designated generally 17 and a similar funnel designated generally 18 is mounted to rotate through a packing gland 19 in the top wall of the chamber 15. The funnels 17 and 18 are adapted to move through adjacent opposed substantially horizontal arcs of approximately 180 degrees each, and extending between the funnels is a substantially vertical baffle plate 20 which serves to isolate these funnels from one another, as will be readily understood upon reference to Figures 1 and 2.

The funnels 17 and 18, above referred to, each comprise a horizontal tubular leg 21 terminating at one end in an enlarged funnel-shaped portion 22, and at its opposite end in an upwardly extending tubular arm 23 which terminates at its end remote from the tubular member 21 in a horizontally extending portion 24 which opens at its end remote from the portion 23 in a vertical tubular body 25 which enters the respective chest and is provided near its lower end with radial openings 26 through which air entering the respective funnel is conducted into the respective chamber.

As illustrated, the lower end of the vertical leg 25 of each funnel has coupled thereto a drive shaft 27 which is mounted to rotate about a vertical axis in a case 28 provided adjacent opposite ends with arcuate windows 29 opening through the bottom wall thereof. These windows 29 are arranged concentrically about the axes of the shafts 27 and are equipped with arcuate cover glasses 30 of any suitable transparent material, and arranged beneath each cover glass is a dial 31 carrying, on the face facing the cover glass indices 32. A pointer 33 is fixed to each shaft 27 within the case 28 to move over the face of its respective dial 31 and cooperate with the indices 32 in establishing the angular relation of the funnels 17 and 18 with the direction of motion of the vehicle upon which the device is mounted. Mounted on the shafts 27 between the case 28 and the chest 12 are meshing gears 34 which are so arranged that when one shaft is rotated, the other shaft moves in unison therewith, but in an opposite direction. A hand lever 35 is fixed to one of the shafts 27 and projects radially therefrom to a point beyond the peripheral confines of the case 28. A suitable hand-grip 36 is fixed to the end of the hand lever 35 remote from that which is coupled to the shaft 27 and it will thus be seen that by moving the hand lever through a substantially horizontal arc, the funnels 17 and 18 will be swung about the axes of the tubular extensions 25 to various different positions as illustrated in Figure 1. It will also be seen that the indicator hands 33 will be moved over the faces of the respective dials so that the angular relationship of the funnels 17 and 18 to the direction of travel of the vehicle may be determined.

Formed in the outer side wall of each chamber 14 and 15 of the chest 12 is an air discharge opening into which is coupled one end 37 of each tubular conduit 38 and 39. The opposite ends of these conduits 38 and 39 lead into the chambers 40 and 41 respectively of a pressure indicator designated generally 42. This pressure indicator comprises a case 43 supporting intermediate its ends a fluid pressure responsive diaphragm 44 which separates the case into the compartments 40 and 41 which are of substantially identical volumetric capacity. One face of the case 42 is provided with a window opening 45 which is closed by a transverse window 46, and mounted within the case 42 is a suitable dial 47 carrying on its face which is exposed through the window 46 suitable indices 48. As illustrated in Figure 6, the dial 47 is located in the compartment 40, though it is to be understood that it may, if so desired, be located in the compartment 41, with the balance of the parts reversed. Mounted for oscillation in a plane perpendicular to the plane of the diaphragm 44 within the compartment 40 on a suitable bracket 48' is an arm 49 carrying adjacent its lower end a ball head 50. As illustrated, the pivotal support 51 of the arm 49 is near the top of the case 42, and mounted for oscillatory motion in suitable bearing brackets 51' adjacent the lower end of the case within the compartment 40 is a rock shaft 52. Fixed to one end of the rock shaft 52, and movable over the face of the dial 47 beneath the cover glass 46 is a pointer 53, the end of which remote from the rock shaft 52 is adapted to cooperate with the indices 48 on the dial 47. A rock arm 54 is fixed to the end of the shaft 52 remote from the pointer 53 and carries at its end remote from the end which is fixed to the shaft 52 a socket 55 in which is seated a spherical head 56 formed at one end of a link 57. The opposite end of the link 57 is provided with a socket 58 for the reception of the spherical head 50 of the rock arm 49 previously referred to. The rock arm 49 is provided intermediate its ends with a laterally projecting bracket 59 which extends toward the diaphragm 44 along an axis which lies perpendicular to the axis of the pivotal support 51 of said rock arm. A link 60 is pivotally coupled at 61 to the bracket 59, and the axis of the pivotal coupling 61 lies parallel with the axis of the pivotal support 51 of the arm 49. The link 60 is connected at its end remote from the arm 49 to the diaphragm 44 so that as the diaphragm flexes, the link 60 will cause the arm 49 to move about the axis of its pivotal support 51. As illustrated in Figure 7, the lever 54 and the link 57 form a joint which is of greater length than the distance between the axis of the socket 55 and the axis of the shaft 52 so that the rock arm 54 will lie at an angle to the axis of the arm 49 and hence, fluctuation of the diaphragm 44 in either direction will cause a corresponding motion of the pointer 53.

Coupled to the link 60 and projecting into the chamber 41 in axial alignment therewith on the opposite side of the diaphragm 44 is a link 62. This link is supported intermediate its ends on a pivot 63 carried at the upper end of a rock arm 64 which is pivotally supported adjacent its lower end as at 65 on a suitable bracket 66 carried by the case 42 on the side diametrically opposite that to which the bracket 48 is coupled.

Mounted in the case 42 near the bracket 66 is a ground contact 67, and mounted on insulating bushings 68 and 69 which extend through the case 42 near the contact 67 are binding posts 70 and 71 respectively, the inner ends of which project into the case and are provided at their inner ends with contacts 72 and 73 respectively between which a movable contact 74 operates. The movable contact 74 is supported at the lower end of a spring arm 75 which is pivotally supported intermediate its ends as at 76 on a suitable bracket 77, and the upper end of the spring arm 75 is pivotally coupled as at 78 to the end of the link 62 remote from the diaphragm 44. It will thus be seen that as the diaphragm 44 flexes, the link 62 will rock the rock arm 75 and move the movable contact 74 into engagement with one or the other of the contacts 72 or 73.

Mounted in a conventional electrical lamp receptacle or socket in a position to illuminate the dial 31 on the left side of the device when viewed as in Figure 5 is a lamp 79, and a similar lamp 80 is mounted to illuminate the dial 31 on the right side of the device. A suitable conductor 82 leads from a power source 83 such as a primary or storage battery to one terminal of each lamp socket, and the terminal of the battery opposite that which is coupled to the conductor 82 leads to ground through the medium of a conductor 83. The terminal of the lamp socket in which the lamp 79 is mounted opposite that to which the conductor 82 is coupled, has connected thereto a conductor 84, and a similar conductor 85 leads from the terminal of the lamp 80 opposite that which is electrically connected to the conductor 82. The conductor 84 is coupled as illustrated in Figure 6 to the binding post 70 while the conductor 85 is coupled to the binding post 71. With the contact 67 grounded, it will be obvious that when the contact 74 moves into engagement with the contact 72, power will flow from the power source 83 through the conductor 82 and lamp 79 to illuminate the latter. Obviously, when the contact 74 moves into contact with the contact 73, power will flow through the conductor 82 to illuminate the lamp 80. In this way, the illumination of one or the other of the lamps 79 or 80 is controlled by the flexing of the diaphragm 44, and will indicate from which side of the ship the wind is blowing as will be more fully hereinafter explained.

In use, the chest 12 is mounted in the upper deck or top of the fuselage of the ship with the vane or baffle plate 20 lying along an axis which lies in a plane with the longitudinal axis of the ship. In this position, the dials 31 will be visible to the pilot or operator of the ship through the panels 30. The lever 35 is then rotated about the axis of the shaft 27 to which it is coupled to move the funnels 17 and 18 into parallelism with their open ends disposed toward the direction in which the ship is moving. The case 42 has in the meantime been mounted in a convenient position on the ship for reading by the pilot or operator of the ship and consequently, the air entering the funnels will be directed into the case 42 on opposite sides of the diaphragm 44. In event that there is no wind blowing, the pressure in the chambers 40 and 41 will be equal and consequently no flexing of the diaphragm 44 will occur. Hence, the hand or pointer 53 will remain in the zero position with relation to the indices 48 on the dial 47. Should a cross wind be blowing, the pressure created in one or the other of the chambers 40 or 41 will be greater than in the opposite chamber with a resulting flexing of the diaphragm 44 and consequent moving of the pointer 53. Such flexing of the diaphragm 44 will also move the link 62, causing the arm 75 to swing about its pivot 76 and engage one or the other of the contacts 72 or 73. Should the pressure be greater in the compartment 40, it will be obvious that the contact 74 will move into engagement with the contact 72, thus completing an electrical circuit through the lamp 79, and illuminating the dial on the left side of the device when viewed as in Figure 5. In this way, the direction from which the wind is blowing will be determined. The lever 35 is then rotated to cause the funnels 17 and 18 to rotate about their vertical axes of the shafts 27 until the funnel 17 moves to a point at which the maximum wind pressure in chamber 40 is registered on the dial 47 by the pointer 53. The velocity of the wind is then determined by the position of the pointer 53 relative to the indices 48, and the direction from which the wind is blowing can be accurately determined by the position of the pointer 53 on the left side of the device in conjunction with the indices 32 on the adjacent dial 31. In this way, an accurate determination of the direction from which the wind is blowing relative to the ship, and the velocity of the wind may be obtained. Should the wind be blowing from the opposite side of the ship, it is obvious that the pressure in the chamber 41 will be greater than that in the chamber 40 with a consequent flexing of the diaphragm 44 to move the contact 74 into contact with the contact 73, thereby completing the circuit through the lamp 80 when the funnels lie parallel with one another and their mouths 22 turned in the direction in which the ship is travelling. The wind pressure or velocity and its direction relative to the direction of travel of the ship is then determined as previously described by turning the mouth of the funnel 18 until the maximum pressure or velocity is registered by the pointer 53 moving over the indices 48 on the dial 47.

While in the foregoing there has been shown and described the preferred embodiment of this invention it is to be understood that minor changes in the details of construction, combination and arrangement of parts may be resorted to without departing from the spirit and scope of the invention as claimed.

Having described the invention what is claimed as new is:

1. A wind gauge comprising a pair of funnels mounted to oscillate about spaced parallel axes, means to move said funnels in unison in opposite directions through substantially horizontal 180 degree arcs, a fluid pressure responsive diaphragm against opposite sides of which air entering the funnels is directed and means actuated by the flexing of the diaphragm to register the pressure exerted thereon.

2. A wind gauge comprising a pair of funnels mounted to oscillate about spaced parallel axes, means to move said funnels in unison in opposite directions through substantially horizontal 180 degree arcs, a fluid pressure responsive diaphragm against opposite sides of which air entering the funnels is directed and means actuated by the flexing of the diaphragm to register the pressure exerted thereon, and means movable with the funnels to indicate in degrees the angular positions of the funnels.

3. A wind gauge comprising a pair of funnels mounted to oscillate about spaced parallel axes, means to move said funnels in unison in opposite directions through substantially horizontal 180 degree arcs, a fluid pressure responsive diaphragm against opposite sides of which air entering the funnels is directed and means actuated by the flexing of the diaphragm to register the pressure exerted thereon, and a baffle between the funnels for preventing an air current directed toward one side of the gauge from entering the funnel on the opposite side thereof.

4. A wind gauge comprising an air chest having two separate chambers, a wind collecting funnel opening into each chamber of the air chest, each funnel being mounted in its respective chamber to rotate in a horizontal arc, means to rotate said funnels in unison in opposite directions, a fluid pressure responsive diaphragm, means leading from one chamber to direct air entering said chamber against one side of the diaphragm, means leading from the opposite chamber to direct air entering said chamber against the opposite side of the diaphragm and means actuated by the flexing of the diaphragm to register the pressure exerted thereon.

5. A wind gauge comprising an air chest having two separate chambers, a wind collecting funnel opening into each chamber of the air chest, each funnel being mounted in its respective chamber to rotate in a horizontal arc, means to rotate said funnels in unison in opposite directions, a fluid pressure responsive diaphragm, means leading from opposite chambers to direct air entering said chambers into contact with opposite sides of the diaphragm and means actuated by the flexing of the diaphragm to register the pressure exerted thereon.

6. A wind gauge comprising a pair of funnels mounted to oscillate about spaced parallel axes, means to move said funnels in unison in opposite directions through substantially horizontal 180 degree arcs, a housing, a fluid pressure responsive diaphragm separating the housing into two separate compartments of substantially equal volumetric capacity, means leading from opposite funnels into opposite compartments and means actuated by the flexing of the diaphragm to register the pressure exerted thereon.

7. A wind gauge comprising an air chest having two separate chambers, a wind collecting funnel opening into each chamber of the air chest, each funnel being mounted in its respective chamber to rotate in a horizontal arc, means to rotate said funnels in unison in opposite directions, a housing, a fluid pressure responsive diaphragm separating the housing into two separate compartments, means for directing air from opposite chambers to opposite compartments, and means actuated by the flexing of the diaphragm to register the pressure exerted thereon.

8. A wind gauge comprising an air chest having two separate chambers, a wind collecting funnel opening into each chamber of the air chest, each funnel being mounted in its respective chamber to rotate in a horizontal arc, means to rotate said funnels in unison in opposite directions, a fluid pressure responsive diaphragm, means leading from one chamber to direct air entering said chamber against one side of the diaphragm, means leading from the opposite chamber to direct air entering said chamber against the opposite side of the diaphragm and means actuated by the flexing of the diaphragm to register the pressure exerted thereon, and means movable with the funnels to indicate in degrees their angular positions.

9. A wind gauge comprising an air chest having two separate chambers, a wind collecting funnel opening into each chamber of the air chest, each funnel being mounted in its respective chamber to rotate in a horizontal arc, means to rotate said funnels in unison in opposite directions, a fluid pressure responsive diaphragm, means leading from opposite chambers to direct air entering said chambers into contact with opposite sides of the diaphragm and means actuated by the flexing of the diaphragm to register the pressure exerted thereon, and means movable with the funnels to indicate in degrees their angular positions.

10. A wind gauge comprising a pair of funnels mounted to oscillate about spaced parallel axes, means to move said funnels in unison in opposite directions through substantially horizontal 180 degree arcs, a housing, a fluid pressure responsive diaphragm separating the housing into two separate compartments of substantially equal volumetric capacity, means leading from opposite funnels into opposite compartments and means actuated by the flexing of the diaphragm to register the pressure exerted thereon, means movable with the funnels to indicate in degrees their angular positions and a baffle between the funnels for preventing an air current directed toward one side of the gauge from entering the funnel on the opposite side thereof.

ADRIAN A. BAXTER.

REFERENCES CITED

The following references are of record in the file of this patent:

UNITED STATES PATENTS

| Number | Name | Date |
|---|---|---|
| 1,897,658 | Apthorp | Feb. 14, 1933 |
| 2,029,700 | Boykow | Feb. 4, 1936 |
| 2,400,701 | Meredith | May 21, 1946 |

FOREIGN PATENTS

| Number | Country | Date |
|---|---|---|
| 9,102 | Great Britain | June 21, 1915 |